FINN A. HALS
INVENTOR.

BY Alden D. Redfield
Melvin E. Frederick
ATTORNEYS

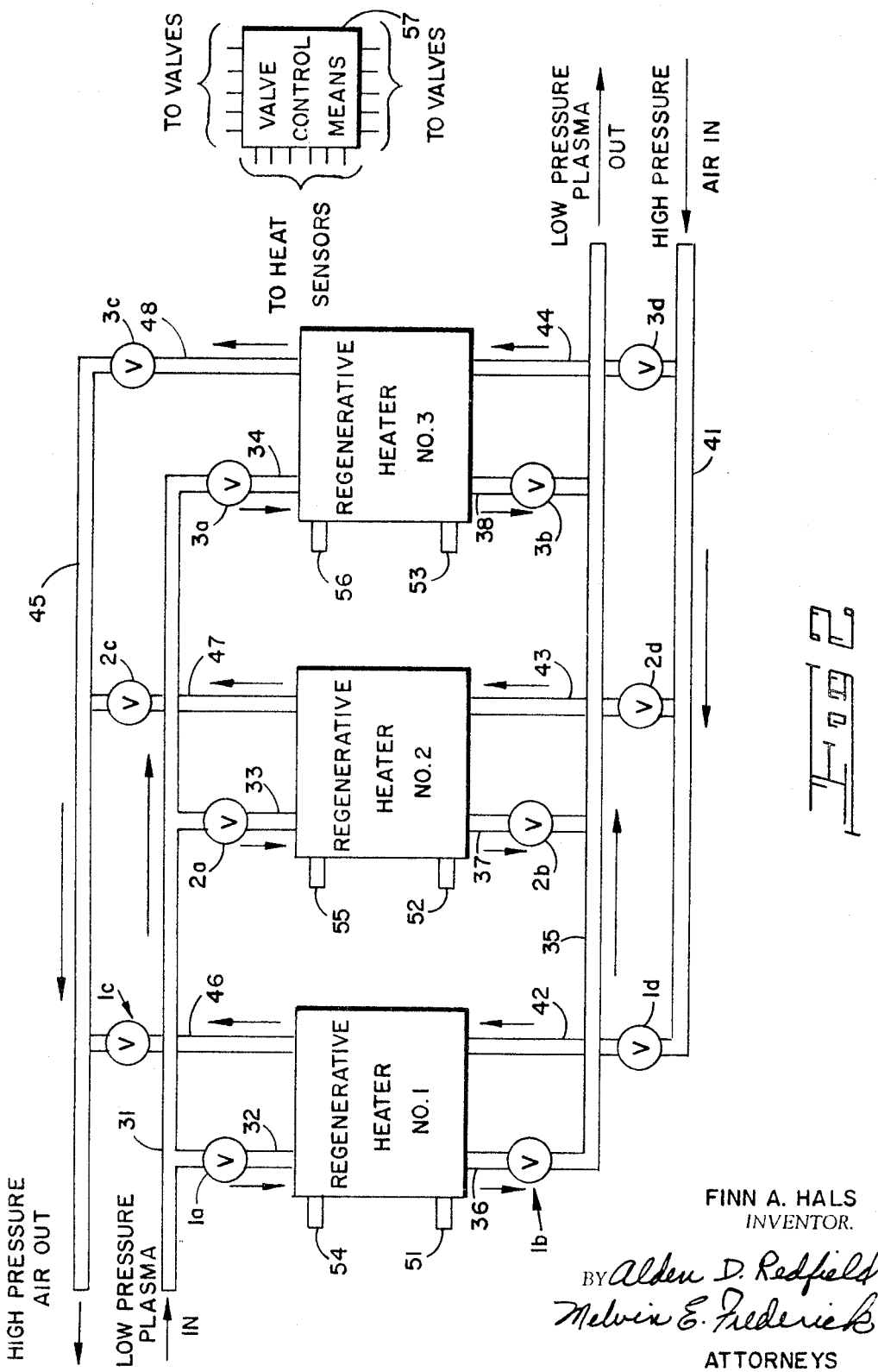

United States Patent Office 3,449,602
Patented June 10, 1969

3,449,602
MEANS FOR AND METHOD OF HEATING GASES FOR MAGNETOHYDRODYNAMIC DEVICES
Finn A. Hals, Lexington, Mass., assignor to Avco Corporation, Cincinnati, Ohio, a corporation of Delaware
Filed May 2, 1966, Ser. No. 546,721
Int. Cl. H02n 4/02
U.S. Cl. 310—11    15 Claims

ABSTRACT OF THE DISCLOSURE

Means for and a method of heating a combustion supporting medium such as air for MHD devices wherein the air is first preheated in a recuperative heater and then passed through and heated to its final temperature in regenerative heater means that prior to receiving the air is raised to a temperature and for a time that results in re-evaporation of any condensed seed in the regenerative heater means.

---

Figure 1:
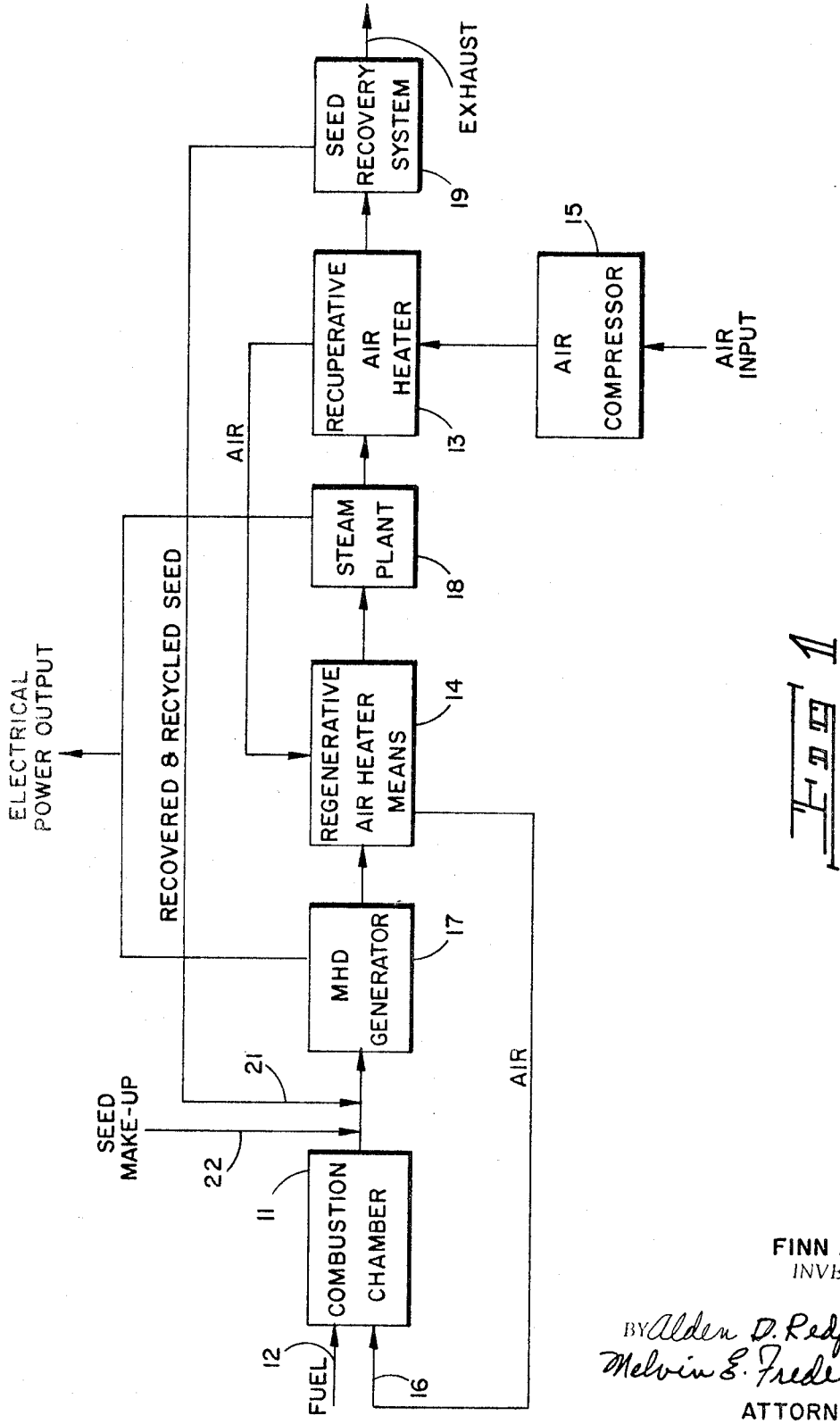

The present invention relates generally to means for and a method of heating gases for magnetohydrodynamic (hereinafter abbreviated "MHD") devices and more particularly to means for and a method of preheating air used for combustion of fuel in MHD devices.

In general terms, MHD devices such as generators produce electrical power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. The gas may exhaust to a sink, which may simply be the atmosphere; or, in more sophisticated systems, the gas may exhaust to a recovery system including pumping means for returning the gas to the source.

Several different gases may be used; the gas may be products of combustion, or may comprise inert gases, such as helium or argon. In open systems, i.e., those in which the gases are not recycled after passing through the power plant, products of combustion are normally used. In closed systems, in which the gases are recycled, it is feasible to use relatively expensive gases, such as helium and argon. To promote electrical conductivity, the gases are heated to a high temperature; conductivity is also increased by the addition to the gases of a substance that ionizes readily at the operating temperature of the generator. Regardless of the gas used, it comprises a mixture of electrons, positive ions and neutral atoms which, for convenience, may be termed "plasma."

The temperature of the plasma is highly significant, not only to the overall efficiency of the system, but also to the design of the MHD generator. With a higher temperature available at the inlet of the generator, a larger isentropic drop can be developed as the plasma expands through the generator, resulting in improved plant efficiency. Further, since the electrical conductivity of the plasma increases greatly as temperature increases, it is possible to generate a given amount of power in a relatively smaller generator and employ a smaller magnetic field than would otherwise be possible. The increased efficiency of the system, considerably above that of conventional steam turbine power plants, and the absence of hot moving parts in the generator suggests that, in time, MHD power plants of the type generally disclosed in patent application Ser. No. 8,566, filed Feb. 15, 1960, now U.S. Patent No. 3,264,501, issued Aug. 2, 1966 and entitled "Magnetohydrodynamic Power Plant" to which reference is made, will replace power generating systems of conventional design.

Combustion products from burning natural gas, oil or coal do not ionize until extremely high temperatures are reached. However, as previously noted, if a small amount of a material which ionizes more easily, such as an alkali, is added to the gas, sufficient ionization can be achieved at temperatures which feasibly can be produced in combustion chambers. For a plasma consisting essentially of combustion products, combustion temperatures in excess of 4000° F. are required for good performance. The impurity added is called seed; and the process, seeding. In practice, seeding is done by adding an alkali salt to the plasma rather than the more expensive pure metal.

To date, potassium has been selected as seed for economic reasons. The least expensive potassium salt, KCl, is not considered suitable as seed because the chlorine atom is strongly electronegative and captures the electrons given off by the potassium. It is therefore necessary to use a more expensive salt, such as for example potassium carbonate, potassium sulfate, or potassium hydroxide, as seed.

The amount of potassium carbonate, potassium sulfate, potassium hydroxide and the like required to obtain sufficient conductivity of the plasma in a coal fired generator will be of the order of 2–10% of the fuel weight. This corresponds to a seed concentration of about 0.1–0.3% by volume after combustion. The aforementioned amount of seed required is about ten times or more the amount of the potassium commonly present in coal ash and of course in a natural gas fired MHD generator, the natural gas per se will not contain seed. Accordingly, seed must be added to the combustion products of coal, oil, natural gas and the like.

For a more thorough discussion of conductivity and the provision of a suitable plasma for MHD generators as by oxygen enrichment or preheating, reference is made to the aforementioned patent application Ser. No. 8,566; however, for present purposes, suffice it to say that conductivity is a very strong function of the gas temperature and gas conductivity of more than about one mho per meter is required, corresponding to peak gas temperatures in excess of 4000° F.

The use of seed is required in the operation of MHD generating systems and the seed chemicals are expensive and must be recovered for economic operation of MHD electrical generating plants. Because the efficiency of an MHD generating plant is inherently higher than that of conventional steam generating plants, the cost of net power generated may be expected to be less than that for steam generating plants. However, without seed recovery in an MHD plant, the cost of fuel plus seed exceeds the cost of fuel for a comparable steam generating plant. On the basis of cost per kilowatt hour, the cost of fuel and seed decreases linearly from an amount substantially in excess of the cost of fuel for steam generating plants for zero percent recovery of seed to an amount substantially less that that for steam generating plants for high percentages of recovery. For a further discussion of seed recovery, reference is made to my patent application Ser. No. 315,-846, filed Oct. 14, 1963, now U.S. Patent No. 3,303,364, issued Feb. 7, 1967.

As will now be evident, in order to attain sufficiently high flame temperatures so that combustion products can be used as a plasma in an MHD generator, the combustion air must either be enriched with oxygen or preheated to relatively high temperatures. Further, the combustion products must be seeded and the seed subsequently recovered and reused.

As has already been mentioned, the gas conductivity is a very strong function of temperature and combustion temperatures in excess of 4000° F. is required in order to use combustion products as a working fluid in an MHD generator. Since a combustion temperature of only about 3000° F. can be attained by combustion of fossil fuel with air supplied at room temperature, this means that the air must be preheated to relatively high temperatures before combustion in an MHD system.

Ideally, regenerative preheat of the fuel oxidizer, as has been noted hereinabove, should be as high as possible as this will give the highest net overall efficiency with the best utilization of the fuel and plant equipment. However, the preheat temperature is limited by the availability and costs of high temperature materials, together with the feasibility of operating with seed impurities in the combustion gases, as well as recovery of the seed. The application of conventional tubular metal heat exchangers is in practice limited to about 1000–1500° F. due to corrosion problems and excessive costs of high temperature alloys.

The problems of a preheat system can be partially alleviated by the use of storage-type regenerative heaters, such as for example pebble bed heaters, because of their capability of operating at temperatures substantially in excess of 1500° F. Such storage-type heaters generally employ a refractory material as the heat bed matrix and heat transferring medium between hot combustion products and combustion air and for this reason are capable of preheating air to much higher temperatures than that possible with tubular metal heat exchangers. Such heaters have been used in other processes to preheat air with hot combustion gases to temperatures as high as 4000° F.

However, even assuming the use of a clean fuel, such as natural gas, a major problem unique to MHD power plants is created by the seed material introduced to enhance the electrical conductivity of the products of combustion. Through the MHD generator itself, the seed is transported with the plasma in the vapor phase, but condensation of seed occurs as the plasma exhausted from the MHD generator is cooled, such as for example when utilized to preheat combustion air in a regenerative heat exchanger system.

Thus, heretofore, consideration of the use of storage-type regenerative heaters was not practical because condensation of seed in the heater soon makes continuous operation with economical recovery of seed impossible. Further, even if a moving bed type of storage heater or replacement of the heat exchange medium is used, such arrangements result in mixture of gases, substantial and continuous heat loss by removal of the hot pebbles, more costly leaching procedures to recover the seed, and the like.

Accordingly, even though the capital costs are high, heretofore, oxygen enrichment has been preferred because the high flame temperatures required can be attained with less preheat than if air is used.

A major problem unique to MHD power plants is created by the seed material introduced to enhance the electrical conductivity of the gas. Condensation of seed will occur as the exhaust gas from the MHD generator is cooled when utilized to preheat the combustion air causing blockage of the heat. If the seed deposited is not removed again, the accumulation of seed within the bed will become intolerable. Furthermore, the seed chemicals are expensive and must be recovered and recycled for economic operation, and the heater bed refractory material must be compatible to operate with alkali laden gases and condensed seed.

The behavior of seed is of critical importance for continuous operation of a high temperature air heater system, as well as for recovery of seed. The seed will vaporize at the high flame temperatures in excess of 4000° F. and is transported through the MHD generator in the vapor phase. However, condensation of seed will occur as the gas is further cooled when utilized to preheat the combustion air. Therefore, simultaneously with heat transfer, mass transfer of condensible seed constituents in the gas can occur.

The present invention is based on the principle that whereas the heat transfer between a gas and a solid surface is proportional to the temperature gradient in the surface boundary layer, the mass transfer of a seed component is determined by the concentration gradient or partial pressure gradient of the seed component in the boundary layer. When the partial pressure of seed is higher than the corresponding equilibrium vapor pressure, the gas is supersaturated with seed and condensation will occur and when the equilibrium vapor pressure is higher than the partial pressure of seed at the same temperature, the gas is unsaturated with seed and can absorb seed by evaporation.

In accordance with the present invention, novel apparatus for and a method of heating gases for MHD devices comprises passing seeded exhaust gas from an MHD device through a storage-type regenerative heater until the temperature of the heat transferring medium of the heater is greater than the temperature at which the equilibrium vapor pressure of the seed equals its partial pressure and thereafter passing the gas to be heated through the heat transferring medium.

In view of the foregoing discussion, it will be apparent that it is an object of the present invention to provide means for and a method of heating gases for MHD devices.

It is another object of the present invention to provide a high temperature regenerative preheater system for MHD power plants.

It is a further object of the present invention to provide a regenerative preheater system for MHD devices that is not substantially affected by seed.

It is a still further object of the present invention to provide a method of preheating combustion air for MHD power plants continuously to very high temperatures.

Another object of the present invention is the provision of a method of preheating air for MHD power plants to temperatures in excess of 2000° F. without the requirement of special measures for the removal of seed deposited in the preheater.

A still further object of the present invention is the provision of apparatus for and a method of preheating combustion air for MHD power plants to higher temperatures than otherwise possible resulting in more efficient and economical operation.

It is a further object of the present invention to provide apparatus for and a method of preheating combustion air for MHD power plants to high temperatures wherein the seed may be economically recovered from the MHD generator exhaust gases downstream of the preheater.

It is a still further object of the present invention to provide apparatus for and a method of continuous operation of a regenerative high temperature heat exchanger system in an MHD cycle capable of preheating combustion air to very high temperatures by alkali seeded MHD exhaust gases wherein the regenerative system cleans itself of seed which condenses and deposits within the heat exchanger system.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is a block diagram illustrating an open cycle MHD power generating system relying on preheat of the combustion supporting medium; and FIGURE 2 is a diagrammatic illustration showing details of regenerative heater means in accordance with the invention.

In FIGURE 1 is illustrated in block diagram form a power generating system in which fuel 12 is introduced to combustion chamber 11 and is burned in the presence of air. In order to develop within the combustion chamber 11 a plasma of sufficiently high temperature, the air is first preheated to, for example, 1000° F. as in the recuperative air heater 13 and then again preheated to 2000° F. or more in regenerative air heater means 14 more fully described hereinafter. Atmospheric air is compressed by air compressor 15 and passes through the recuperative heater 13 and regenerative heater means 14 before introduction to the combustion chamber at 16.

The hot, seeded, electrically conductive plasma from the combustion chamber is introduced directly to an MHD generator 17. After expansion in the MHD generator to a lower temperature, the plasma exhausted from the generator flows through the regenerative heater means 14 where a portion of its heat is used for finally preheating the air introduced to the combustion chamber at 16. From the regenerative heater means 14, the plasma, still further reduced in temperature, flows through a steam plant 18, recuperative heater 13, a seed recovery system 19, and eventually to a heat sink, such as the atmosphere. The steam plant 18 may comprise conventional heat exchangers for extracting heat from the working fluid and generating steam for driving steam turbines (not shown). The turbines drive generators for supplementing the power output of the MHD generator and may drive auxiliaries, such as the air compressor 15.

The seed recovered in the seed recovery system 19 is introduced into the plasma upstream of the MHD generator as at 21 together with the required seed makeup as indicated at 22. Suitable apparatus for and a method of economically recovering seed as previously mentioned is disclosed in my patent application Ser. No. 315,846.

The construction and operation of regenerative heaters to provide preheat temperatures of 1000° F. in conventional steam plants and the like are believed to be so well known as to not require discussion thereof or reference to the technical literature. However, while regenerative heaters capable of providing preheat temperature up to about 4000° F. are perhaps less well known, a thorough discussion of the design, construction and operation of one type (most widely known and referred to as pebble bed heaters) suitable for use in accordance with the invention may be found in "A Review of the Wisconsin Process for Nitrogen Fixation, Nitrogen Symposium sponsored by Food Machinery and Chemical Corporation and the Wisconsin Alumni Research Foundation, Nov. 21–22, 1955," "Pebble Bed Heater, New Heat Transfer Unit for Industry published in Chemical and Metallurgical Engineering, July 1946, pp. 116–119," "A Pebble Bed Air Heater for Hypersonic Research published in Ceramic Bulletin, vol. 41, No. 5, 1962, pp. 332–335," and "Storage Heater Design Study for the Hypersonic True Temperature Wind Tunnel" by W. S. Hendric, F. W. Larsen, B. C. Lindahl and D. G. Decoursin, Fluidyne Engineering Corporation, Technical Documentary Report No. AEDC–TDR–64–48, July 1964.

Such heaters operate on the principle of successive heating and cooling of a bed material by the hot combustion gases and combustion air respectively. In accordance with the present invention, for continuous heating of air, such as required in an MHD power plant cycle, a multiplicity of heaters are required where the combustion gases are heating up several beds in parallel while the combustion air at the same time is being heated in the remaining bed or beds. Since relatively high temperatures are involved, a refractory material such as $Al_2O_3$, MgO or $ZrO_2$ with suitable higher temperature properties is employed as the bed matrix materials and heat transfer medium between, for example, hot combustion gases and air. The bed is generally disposed in an adequately insulated vertical cylindrical vessel of steel. The design parameters are determined in conventional manner by considering heat transfer, pressure drop, thermal stressing of bed material, time periods of heating and cooling of bed material, etc.

The dew point for seed in the plasma with a typical seed concentration of 0.2 mol percent K for MHD generator operation is expected to be in the range 1500–2500° F. A typical exit temperature of the gas exhausting from the MHD generator is between 3000–4000° F., which is above the dew point for seed in the gas. As long as the gas temperature is kept above the dew point of seed passing through the air heater bed, no seed will condense within the bed; on the contrary the gas can absorb seed by evaporation corresponding to the equilibrium vapor pressure of seed in the gas at the temperature in question. On the other hand, as soon as the gas is cooled below the dew point of seed, seed will condense and deposit within the bed. The vapor pressure of the different potassium compounds in question is a relatively steep function of temperature so that the condensation temperature of seed is not expected to vary significantly with seed concentration.

Referring now to the above discussion of condensation and evaporation of seed, in accordance with the invention the specific method of operation of a high temperature regenerative air heater system in an open MHD combustion cycle will be described. The combustion air is supplied under pressure from a compressor and first heated to, for instance, 1000° F. in a conventional metal tubular heat exchanger. The combustion air is then further heated to, for instance, 3000° F. in the high temperature regenerative heat exchanger system. Air enters at the bottom of the heater on the heat discharge cycle while the heat storage cycle hot MHD exhaust combustion gases enter at the top with a temperature of say 3000° F. or above. The first gas which exits from the heater right after the heat storage cycle has started has a temperature close to the temperature of the bottom of the bed which always is the coolest part of the bed, or about 1000° F. Now as heating of the bed continues during the same cycle, the temperature of the bed at each point will increase. Condensation and deposition of seed from the gas will occur until the entire bed temperature is brought above the dew point for seed in the gas. When this occurs, the coolest part of the bed at the bottom will be close to the dew point for seed and the hottest part at the top close to the gas inlet temperature selected, here 3000° F. Seed, which at first condenses within the bed when the temperature is below the dew point for seed, will evaporate again when the temperature at the same point later on during the same cycle is brought above the dew point for seed. By operating in this manner, the bed will clean itself of seed which then is transported away from the gas and is precipitated and recovered in an electrostatic precipitator system downstream of the high temperature air heater system before the gas exhausts to the atmosphere. A multiplicity of beds arranged in parallel are required which are cycled with certain time periods between combustion gases and combustion air. The heater bed referred to can consist of randomly packed refractory spheres or particles (pebble beds) or be made up of refractory elements, stacked to form parallel axial channels to the gas flow (brick works). The system described permits continuous regenerative preheating of the combustion air by alkali seeded combustion products in an MHD cycle using a clean fuel such as natural gas as the energy source.

Since the variation of dew point with temperature is a steep function, a small increase in temperature over the dew point will permit the plasma exhausted from the generator to evaporate several times the quantity of seed that it can contain at the dew point. Accordingly, in order to remove at least substantially all of the seed in the heater, it is only necessary to maintain this temperature in the heater for a period relatively short compared to that required to reach it.

In view of the preceding discussion, it will now be seen that the described means for and method of heating gases for magnetohydrodynamic devices permit continuous operation of regenerative air heating systems with a seeded plasma in an MHD cycle, whether it be an open or closed cycle.

In accordance with the present invention, the use of a clean fuel such as natural gas is preferred as the combustion products thereof will not contain any ash impurities. With burning of heavy fuel oil and in particular coal containing ash, serious problems will arise due to the ash impurities in the fuel. While part of the ash impurities can be separated by first cycloning the plasma before it enters the regenerative heater system, certain amounts of ash-carryover must be expected which will cause blockage.

Details of the regenerative heater means 14 of FIGURE 1 is shown in FIGURE 2. FIGURE 2 discloses an arrangement for preheating air or the like to high temperatures which, among other things, permits heaters to be taken off the line without requiring shutdown of the generator. It also permits switching of plasma and air between heaters so that continuous operation of the heater system can be achieved.

While only three regenerative heaters are shown to simplify description, it will be understood that a greater number of heaters may be used. For example, each heater shown in FIGURE 2 may be considered to represent a bank of heaters connected in parallel. While in theory a single heater may be used wherein, for example, the plasma continuously heats pebbles which are transferred from a heat storage zone to a heat discharge zone, such an arrangement is not at least at present considered practical because of the difference in pressure between the relatively low pressure (typically one atmosphere) of the plasma exhausted from the generator and the relatively high pressure (typically six atmospheres) of the air supplied to the combustion chamber. This difference in pressure requires gas seals between the heat storage and heat discharge zones that must provide dependable and continuous operation for substantial lengths of time at very high temperatures. Such seals are not presently available.

Directing attention now to FIGURE 2, it will be seen that there is diagrammatically shown three regenerative heaters identified as heaters No. 1, No. 2 and No. 3. Plasma duct 31 together with feeders 32–34 and inlet valves 1a, 2a, and 3a conduct the high temperature plasma from the MHD device to the heaters and plasma duct 35 together with feeders 36–38 and outlet valves 1b, 2b, and 3b conduct the plasma now reduced in temperature from the heaters to, for example, the steam generating plant 18. Similarly, air duct 41 together with feeders 42–44 and inlet valves 1d, 2d, and 3d conduct low temperature air from, for example, the recuperative heater 13 to the regenerative heaters and air duct 45 together with feeders 46–48 and outlet valves 1c, 2c, and 3c conduct the high temperature air from the regenerative heaters to the combustion chamber 11.

Assume now that the pebble bed of heater No. 3 has been heated to the required temperature as noted hereinabove by the flow of plasma, that high temperature air is being supplied to the combustion chamber through heater No. 3 (valves 3a and 3b are closed and valves 3c and 3d are open), and that high temperature plasma is flowing through both heaters No. 1 and No. 2 (valves 1a, 1b, 2a and 2b are open and valves 1c, 1d, 2c and 2d are closed). When, for example, the bottom of the pebble bed of heater No. 2 reaches 2000° F. or more as monitored for example by heat sensing means 52 to end the heat storage cycle of heater No. 2, valves 2a and 2b are closed. Alternately, the heat discharge and storage cycles can be effected by conventional timing means. Subsequent to closure of these valves, valves 2c and 2d are opened as valves 3c and 3d are closed to continuously transfer the incoming air from heater No. 3 to heater No. 2 to start the heat discharge cycle of heater No. 2. Thereafter, valves 3a and 3b are opened to start the heat storage cycle of heater No. 3. Since the flow of plasma through heater No. 1 has not been affected, no substantial change in back pressure on the MHD device will be created. Further, as the air valves for heater No. 2 have have been opened as the air valves for heater No. 1 have been closed, no substantial change in air pressure will occur. At the appropriate time, the above-described procedure is carried out with respect to heater No. 1 and heater No. 2, i.e., the incoming air is transferred from heater No. 2 to heater No. 1 to begin the heat discharge cycle of heater No. 1 while the plasma is now permitted to flow through heater No. 2 to begin its next heat storage cycle. Similarly, when the bed of heater No. 3 has reached the proper temperature, the procedure is again repeated and the switching cycle is complete.

The switching cycle may be performed automatically by simply providing in respectively the upper and lower ends of the regenerative heaters heat sensors 54–56 and 51–53 which actuate conventional valve control means 57 for opening and closing the appropriate valves at the right time.

In accordance with tests conducted in the development of the present invention, a heater was operated on the principle of successive heating and cooling of pebble bed material by hot combustion gases and coolant air respectively. The combustion apparatus upstream of the heater simulated the temperature-time history of a combustion driven MHD generator. Seed and also sulphur were introduced with the combustion air. Seed was added as $K_2SO_4$, and sulphur was added as $SO_2$ gas. The air to be heated was delivered to the bed from a separate air supply at about 1000° F. As only one bed was required for testing purposes, the combustion gases and air were alternately by-passed directly to the atmosphere when not passed through the heater. The pebble bed material used was magnesium oxide of 97–98% purity with particle size ranges from ¼"–¾".

The temperatures of combustion gases and air at the inlet and outlet of the heater were measured with thermocouples, and the temperature transients throughout the bed during the heat storage and heat discharge cycle were measured with thermocouples inserted into the middle of the bed at different heights. A simple physical interpretation of the temperature transients in the heater can be made in terms of a heat wave which travels through the bed. The air was heated up to close to 3000° F.

Different operating conditions with seeding were investigated. Seeding was initially commenced when the bottom temperature of the bed had reached 1950° F. No apparent condensation with deposition of seed was experienced when the entire bed was operating above this temperature. Seeding was then initiated at lower bed temperatures and an increase in pressure drop across the bed was immediately noticed, but as soon as the entire bed, during the same cycle, was heated to above 1900–2000° F. the pressure drop decreased and because normal again. Tests were also conducted with introduction of sulphur together with seed to study the influence which sulphur in the fuel might have on the behavior of seed. During all testing the fuel to oxidizer ratio was stoichiometric and the amount of seed added corresponded to a seed concentration of 0.2–0.4 mol percent K by volume. The amount of sulphur added corresponded to a sulphur content of 3% of the fuel weight. In the cases with the addition of seed, and sulphur plus seed, the pressure drop is at first higher compared to the pressure drop without seeding. The pressure drop at the end of each cycle is practically the same.

The measurements of the heater pressure drop during heating of the bed may be interpreted as follows. The relatively large pressure drop at first with seeded combustion gases as compared to operating with combustion gases without seed is explained by condensation and deposition of seed occurring within the bed, resulting in increased resistance to the flow of gas. The pressure drop then reaches a maximum. This occurs when the bottom of the bed reaches the dew point for seed in the gas. The following decrease or levelling off of the pressure drop as the gas temperature increases through the heater is due to evaporation of seed which first condensed, and which then is transported away with the combustion gases thereby reducing the resistance to the gas flow through the heater.

The maximum operating temperature with the 97% MgO and 98% MgO particles as bed material was 3000° F. Particle samples were extracted from the top and bottom of the bed during the test period with certain time intervals, altogether six times in the course of 115 hours of total operation with seeded combustion gases. During this time period a total of 350 lbs. of seed had been added as $K_2SO_4$. The extracted samples were analyzed for potassium content using flame photometry techniques. First the samples were washed with water to determine if water soluble potassium compounds were present and then standard acid treatment of the samples were employed. In addition, samples from the bottom of the heater were analyzed for sulphur. All analyses of samples extracted from the top part of the heater were negative. Analysis of samples from the bottom revealed that water soluble potassium compounds were present, whereas the acid treatment analyses were negative. Very small amounts of extremely fine crystal particles could be identified deposited on the pebble surface. This deposit was scraped off and was identified as $K_2SO_4$. Beyond this minute deposit, no accumulation of seed was discovered within the bed by removal and inspection of bed material.

The dew point of seed varied from 1800–2000° F. with addition of seed as $K_2SO_4$ and seed concentrations ranging from 0.2–0.4 mol percent K by volume. The dew point was found to be less than 100° F. higher when additional sulphur was added together with the seed, but this slight increase in dew point is not significant for heater operation.

The chemical analysis of the pebble samples indicated that no chemical reactions occurred between the magnesium oxide pebble material, condensed seed, and seeded combustion gases. Minute amounts of seed were deposited on the pebbles in the bottom of the heater, but no noticeable accumulation of seed was discovered within the heater after continued operation of more than 100 hours. The experiments indicate that by extending the bed heating cycle until a maximum bed temperature of about 2100–2200° F. is reached, operating conditions are attained so that the bed can be cleaned preventing intolerable build-up of seed.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:
1. In the method of heating a gas for an MHD device utilizing a high temperature electrically conductive plasma containing an alkali seed vaporized by the temperature of said plasma for promoting electrical conductivity of said plasma, the steps of:
   (a) passing the seeded plasma exhausted from said MHD device through a storage-type regenerative heater until the temperature of all of the heat transferring medium in said heater in contact with said exhaust plasma is greater than the temperature at which the equilibrium vapor pressure of said seed equals its partial pressure;
   (b) passing said plasma exhausted from said regenerative heater through a recuperative heater; and
   (c) passing the gas to be heated through said recuperative heater and then through said heat transferring medium.

2. In the method of heating a gas for an MHD device utilizing a high temperature electrically conductive plasma containing an alkali seed vaporized by the temperature of said plasma for promoting electrical conductivity of said plasma, the steps of:
   (a) passing the seeded plasma exhausted from said MHD device through a storage-type regenerative heater until the temperature of substantially all of the heat transferring medium in said heater in contact with said exhaust plasma is greater than the temperature at which the equilibrium vapor pressure of said seed equals its partial pressure;
   (b) maintaining said temperature of said heat transferring medium until at least a substantial portion of seed deposited in said heater is absorbed by said exhaust plasma;
   (c) passing said plasma exhausted from said regenerative heater through a recuperative heater; and
   (d) passing the gas to be heated through said recuperative heater and then through said heat transferring medium.

3. In the method of heating a gas for an MHD device utilizing a high temperature electrically conductive plasma containing an alkali seed vaporized by the temperature of said plasma for promoting electrical conductivity of said plasma, the steps of:
   (a) directing the seeded plasma exhausted from said MHD device consecutively to and through at least first and second storage-type regenerative heaters until the temperature of substantially all of the heat transferring medium in each said heater in contact with said exhaust plasma is greater than the temperature at which the equilibrium vapor pressure of said seed equals its partial pressure and maintaining said temperature of said heat transferring medium in each said heater by maintaining the flow of said plasma until at least a substantial portion of seed deposited in each said heater is evaporated and carried away by said plasma;
   (b) passing said plasma exhausted from said regenerative heaters through a recuperative heater; and
   (c) passing the gas to be heated through said recuperative heater and then consecutively through each said regenerative heater when said plasma is being directed to the other regenerative heater.

4. The combination as defined in claim 3 wherein said heat transferring medium is heated to a temperature in the range of about 1500–2500° F.

5. The combination as defined in claim 3 wherein said seeded plasma comprises the products of combustion of a substantially ash-free fuel.

6. The combination as defined in claim 5 wherein said heat transferring medium is heated to a temperature in excess of about 2000° F.

7. The combination as defined in claim 3 wherein said seeded plasma and the gas to be heated are directed through said heaters in opposite directions.

8. The combination as defined in claim 3 wherein sufficient heat is transferred to said heat transferring medium to maintain the temperature of said gas to be heated leaving each said heater above about 2000° F.

9. The combination as defined in claim 8 wherein the pressure of said gas to be heated in said heaters is maintained at a level greater than the pressure of said plasma in said heaters.

10. The combination as defined in claim 9 wherein the flow to and from said heaters of respectively the plasma and gas to be heated is effected by separate paths, and the flow of plasma from said MHD device is maintained at least substantially constant when the flow of plasma is being directed from one of said heaters to another of said heaters.

11. In the method of heating a gas for an MHD device utilizing a high temperature electrically conductive plasma containing an alkali seed vaporized by the temperature of said plasma for promoting electrical conductivity of said plasma, the steps of:
   (a) directing the seeded plasma exhausted from said MHD device to and through two of at least three storage-type regenerative heaters until the temperature of substantially all of the heat transferring medium in said two heaters is greater than the temperature at which the equilibrium vapor pressure of said seed equals its partial pressure and maintaining said temperature of said heat transferring medium in said two heaters by maintaining the flow of said seeded plasma therein until at least a substantial portion of seed deposited in said two heaters is evaporated and carried away by said plasma;

(b) passing said plasma exhausted from said two regenerative heaters through a recuperative heater;

(c) passing the gas to be heated, through said recuperative heater and then through the remaining regenerative heater while said plasma is being passed through said two regenerative heaters; and (d) substantially simultaneously switching the flow of plasma and said gas to be heated between said remaining and one of said two regenerative heaters whereby said gas to be heated is consecutively directed from said recuperative heater to and through a previously heated regenerative heater and said plasma at all times flows through one of said regenerative heaters.

12. In combination in a power plant having a combustion chamber for producing plasma for an MHD device:

(a) a source of fuel for the combustion chamber;

(b) means for supplying a combustion supporting medium to the combustion chamber for supporting combustion of said fuel and producing an electrically conductive high temperature plasma for use in said MHD device;

(c) means for introducing seed into said plasma for promoting electrical conductivity of the plasma produced by the combustion of said fuel with said combustion supporting medium; and (d) means for preheating said combustion supporting medium comprising recuperative heater means and at least three storage-type regenerative heater means each having a heat transfer medium, means for passing said seeded plasma through two of said regenerative heater means until the temperature of substantially all of said heat transferring medium in contact with said seeded plasma is greater than the temperature at which the equilibrium vapor pressure of said seed equals its partial pressure, means for passing said combustion supporting medium through said recuperative heater means and then through the remaining regenerative heater means, and switching means for substantially simultaneously switching the flow of plasma and said combustion supporting medium between said remaining and one of said two regenerative heater means whereby said combustion supporting medium is consecutively directed from said recuperative heater means to and through a previously heated regenerative heater means and said plasma at all times flows through one of said regenerative heater means.

13. The combination as defined in claim 12 wherein said fuel is ash-free and said seed is an alkali.

14. The combination as defined in claim 13 wherein said plasma and said combustion supporting medium are directed through said heaters in opposite directions.

15. The combination as defined in claim 14 and additionally including means for actuating said switching means when the temperature of said heat transfer medium in contact with said plasma and adjacent the inlet for said combustion supporting medium is in excess of about 2000° F.

References Cited
UNITED STATES PATENTS 3,264,501  8/1966  Kantrowitz et al. _____ 310—11
3,374,369  3/1968  Broom _____ 310—11

DAVID X. SLINEY, *Primary Examiner.*